United States Patent
Yano et al.

(10) Patent No.: US 6,902,825 B2
(45) Date of Patent: Jun. 7, 2005

(54) BRAZED SINTERED COMPACT

(75) Inventors: Katsuhiko Yano, Niigata (JP); Toshiro Harakawa, Niigata (JP)

(73) Assignee: Mitsubishi Materials Corporation, Tokyo (JP)

( * ) Notice: Subject to any disclaimer, the term of this patent is extended or adjusted under 35 U.S.C. 154(b) by 222 days.

(21) Appl. No.: 10/435,513

(22) Filed: May 9, 2003

(65) Prior Publication Data

US 2004/0013897 A1 Jan. 22, 2004

(51) Int. Cl.[7] .......................... B23K 33/00; B23K 1/00; C04B 37/00; B32B 3/06
(52) U.S. Cl. ...................... 428/550; 428/589; 428/591; 428/609; 228/251; 228/249; 228/248.1
(58) Field of Search ................... 228/251, 249, 228/248.1; 428/550, 589, 591, 609

(56) References Cited

U.S. PATENT DOCUMENTS

| | | | | |
|---|---|---|---|---|
| 4,289,833 A | * | 9/1981 | Hachisuka | 428/544 |
| 5,439,257 A | * | 8/1995 | Williamson | 285/288.1 |
| 5,507,528 A | * | 4/1996 | Mastrosimone | 285/22 |
| 6,592,287 B1 | * | 7/2003 | Hagle et al. | 403/277 |

FOREIGN PATENT DOCUMENTS

| | | |
|---|---|---|
| JP | 58-13469 A1 | 1/1983 |
| JP | 59-209473 A1 | 11/1984 |
| JP | 01118431 | * 12/1990 |
| JP | 2000-109907 A | 4/2000 |
| JP | 2002-79372 A1 | 3/2002 |
| JP | 11192580 A | * 12/2003 |

OTHER PUBLICATIONS

English Abstract JP 95039032 B, Sowa Aluminum Corp, Nov. 1992.*
esp@cenet—Document Bibliography and Abstract for Sintered Compact Joined by Brazing; JP2002079372; Mar. 19, 2003; Yano Katsuhiko; http://12.espacenet.com/espacenet/abstract?CY=ep&LG=en&PNP=JP200207937 . . . .

* cited by examiner

Primary Examiner—John J. Zimmerman
Assistant Examiner—Jason L. Savage
(74) Attorney, Agent, or Firm—Darby & Darby

(57) ABSTRACT

A brazed sintered compact composed of first and second components, which are easily positioned relative to each other, enabling the provision of a good joining clearance. If a protrusion 3 of a first component 1 is fitted into a recess 13 of a second component 10, both components are able to be positioned relative to each other. Simultaneously, a joining clearance A can be easily obtained between a joining surface 2 of the first component 1 and a joining surface 12 of the second component 10, corresponding to a dimensional difference therebetween. Also, an inner side surface 4a of a storage groove 4 is aligned with a right or left end 11a of a leg 11, disposed opposite to the inner side surface 4a. Accordingly, it is possible to allow as much brazing material as properly needed to permeate between the joining surfaces 2 and 12. Further, as the surface tension of the surplus brazing material becomes unlikely to be developed in the storage grooves 4,4', the backflow of the material is prevented.

9 Claims, 3 Drawing Sheets

BRAZED SINTERED COMPACT

BACKGROUND OF THE INVENTION

1. Field of the Invention

The present invention relates to a brazed sintered compact in which two components are brazed to each other, using a brazing material.

2. Description of the Related Art

For conventional art of this kind, it is widely recognized to manufacture a brazed sintered compact in which a first component and a second component are formed by sintering, and then the two components are brazed to each other. Such method has been utilized for manufacturing a product of complex shape, such as planetary carriers for use with an automatic shift for automobiles. Such planetary carriers have been manufactured in the past by subjecting an entire perimeter of cast iron material or a copper plate material to machine processing, resulting to increased man-hours and costs. Therefore, they are now manufactured through the above-mentioned method, i.e., by forming first and second components by sintering green compact and then brazing them to each other.

According to the conventional art, when joining the first and second components to each other by brazing, they are combined together by precise positioning therebetween. In that case, a joining clearance for allowing a brazing material to permeate between the two components becomes a problem.

In other words, if a joining clearance is too large, the penetration amount of the brazing material into the respective components will be too much, so that the components will be expanded and thus distorted, resulting to a likelihood of the noticeable drop of the components' strength. On the other hand, if a joining clearance is too small, there is a risk that the joint strength between the two components drops. Accordingly, it has been a problem how such joining clearance for allowing a brazing material to permeate could be optimized.

Also, whilst Japanese Patent publication No.2000-109907 teaches that small protrusion and recess for guiding purpose are formed on a joining portion so that the former is fitted into the latter in advance, the conventional art had another problem that as a brazing material would be very likely to flow out to the external when the brazing material was placed between the components and heated, such surplus brazing material had to be removed. A solution for solving such problem is proposed by the same applicant in Japanese Patent Application No. 2000-270581 (Publication No.2002-79372). This prior art discloses brazed sintered compact consisting at least of a first component and a second component to be brazed to the first component, in which one of the first and second components has a joining surface formed with a protrusion, while the other thereof has a joining surface formed with a recess, said recess being fitted to said protrusion, having such a depth as allow for a desirable joining clearance with the protrusion being fitted into the recess; and that one of the joining surfaces is formed in a perimeter thereof with a storage groove for storing surplus brazing material, thereby preventing the brazing material from flowing out to the external of the components owing to such groove.

According to the prior art disclosed in the above earlier application, however, the components slightly overhang the groove so that the surplus brazing material is unlikely to be easily discharged, and that the joining clearance could not be optimized duo to the backflow of the brazing material which flowed out to the external and the resultant re-permeation thereby.

SUMMARY OF THE INVENTION

Accordingly, it is an object of the present invention to provide a brazed sintered compact in which components to be joined are able to be easily positioned relative to each other, at the same time that a good and precise joining clearance can be obtained.

To attaint the object, there is proposed a brazed sintered compact in accordance with a first aspect of the present invention, which is composed of at least a first component and a second component, each component having a joining surface and joined to each other by brazing, comprising:

a protrusion formed on the joining surface of one of the first and second components;

a recess formed on the joining surface of the other of the first and second components, said recess being fitted to said protrusion, having such a depth as allows for a desirable joining clearance between the first and the second components when the former is fitted to the latter;

at least one storage groove formed on the joining surface of one of the first and second components, said storage groove being provided for storing a surplus amount of a brazing material, and disposed opposite to a side portion of the other of the first and second components.

As the joining surface of one of the components is formed with the protrusion while that of the other thereof is formed with a recess whose dimension is smaller than the height of the protrusion, both components can be simply positioned relative to each other by fitting the protrusion into the recess. At the same time, it is possible to easily obtain a joining clearance, corresponding to a dimensional difference between the first and the second components.

Accordingly, if both components are sintered with the joining clearance being filled with the brazing material after the joining clearance is set at a predetermined dimension for permeation of the brazing material, it is possible to allow as much brazing material as properly needed to permeate between the joining surfaces of the first and second components, thus enabling a desirable brazing strength to be obtained reliably, thereby enhancing the reliability of the brazing strength.

A second aspect of the invention is a brazed sintered compact composed of similar components of the first aspect, including at least one storage groove formed on a peripheral edge of the joining surface of one of the first and second components, said storage groove being provided for storing a surplus amount of a brazing material, arranged such that an inside surface of the storage groove is aligned with an opposite portion of the other of the first and second components.

With the structure, as the inside surface of the storage groove is aligned with an opposite portion of the other of the first and second components, the backflow of the surplus brazing material stored in the storage groove due to the surface tension thereof is prevented, enabling the permeation of as much brazing material as properly needed into between the first and the second components.

A third aspect of the invention is a brazed sintered compact according to the second aspect, featured by that said clearance has such a dimension as properly needed to allow the brazing material to permeate between the joining surfaces of said first and second components.

Accordingly, it is possible to easily obtain a joining clearance, corresponding to a dimensional difference between the first and the second components, so that the permeation of the brazing material is insured.

A fourth aspect of the invention is a brazed sintered compact according to the third aspect, in which said first component and second component are annular plate materials each of which is formed from metal powder individually, and then they are combined with each other while a brazing material is filled in between the joining surfaces of the components, so that both components are sintered at a predetermined temperature in a furnace, at the same time that the brazing material is fused so as to braze one of the joining surfaces of the components to the other thereof.

With the structure, sintering of the first and second components composed of metal powder, can be carried out simultaneously with the brazing of them.

A fifth aspect of the invention is a brazed sintered compact according to the forth aspect, in which said storage groove is fully opened upward.

Accordingly, as the surface tension of the surplus brazing material becomes unlikely to be developed in the storage groove, the backflow of the surplus brazing material is prevented.

A sixth aspect of the invention is a brazed sintered compact according to the fifth aspect, in which one of said first and second components is formed with a protrusion or a recess, while the other thereof is formed with a leg opposite thereto, said leg including a recess or a protrusion on a distal joining surface thereof, and wherein the inner side surface of said storage groove is aligned with a right or a left end of said leg.

With the structure, the surplus brazing material on the right or left side of said leg can be stored in said storage groove.

A seventh aspect of the invention is a brazed sintered compact according to the sixth aspect, in which a hole for inserting a brazing material pellet is formed between the right and the left storage grooves.

Thus, the brazing material pellet can be inserted from the hole.

An eighth aspect of the invention is a brazed sintered compact according to the fifth aspect, in which one of said first and second components is formed with a protrusion or a recess, while the other thereof is formed with a leg opposite thereto, said log including a recess or a protrusion on a distal joining surface thereof, and wherein the inner side surface of said storage groove is aligned with a peripheral edge of the peripheral outer surface of said leg.

Thus, the surplus brazing material on the peripheral outer surface side of said leg can be stored in said storage groove.

A ninth aspect of the invention is a brazed sintered compact according to the fifth aspect, in which said first component and second component in the form of said annular plate member is a planetary carrier composed of a pair of side plates which oppose to each other with a planetary pinion therebetween.

With the structure, even if the brazed sintered compact of the invention is a planetary carrier of such a complex shape, it can be easily manufactured.

BRIEF DESCRIPTION OF THE DRAWINGS

For more complete understanding of the present invention, reference is now made to the following description taken in conjunction with the accompanying drawings, in which.

DETAILED DESCRIPTION OF THE PREFERRED EMBODIMENTS

Hereunder is a description of embodiments of the present invention with reference to FIG. 1 through FIG. 5.

Figure 1:
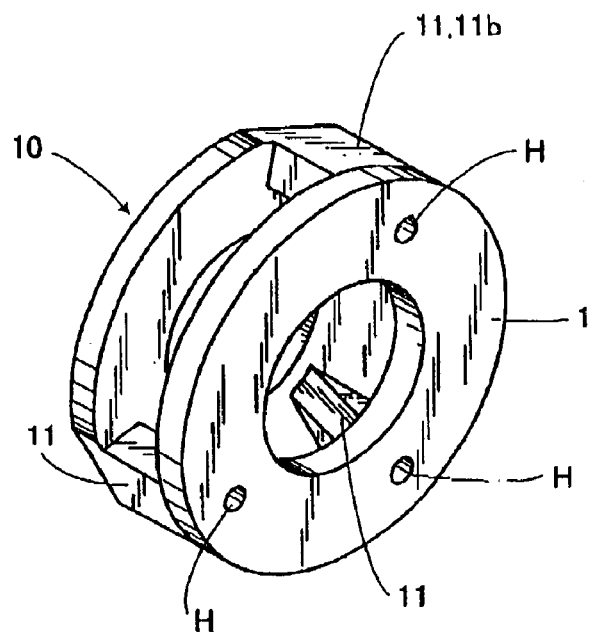
FIG. 1 is a perspective view showing a brazed sintered compact according to an embodiment of the present invention.
Figure 2:
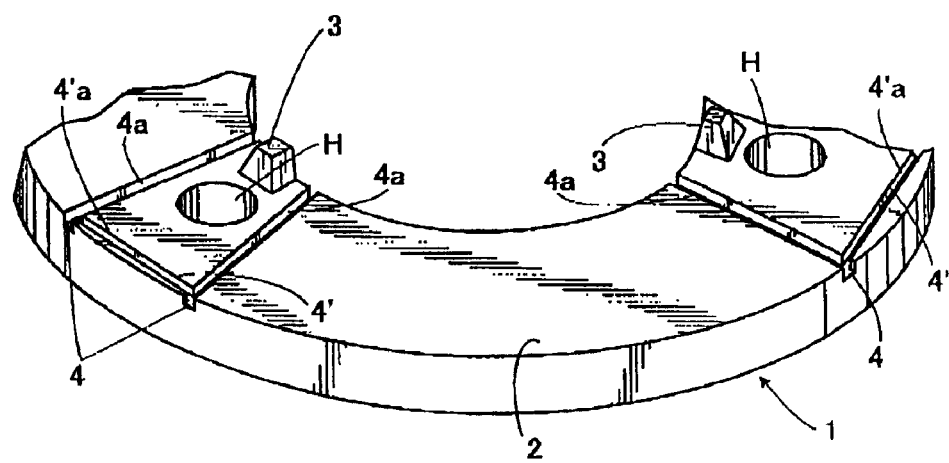
FIG. 2 is a fragmentary perspective view showing a first component of the brazed sintered compact according to the embodiment of the present invention.
Figure 3:
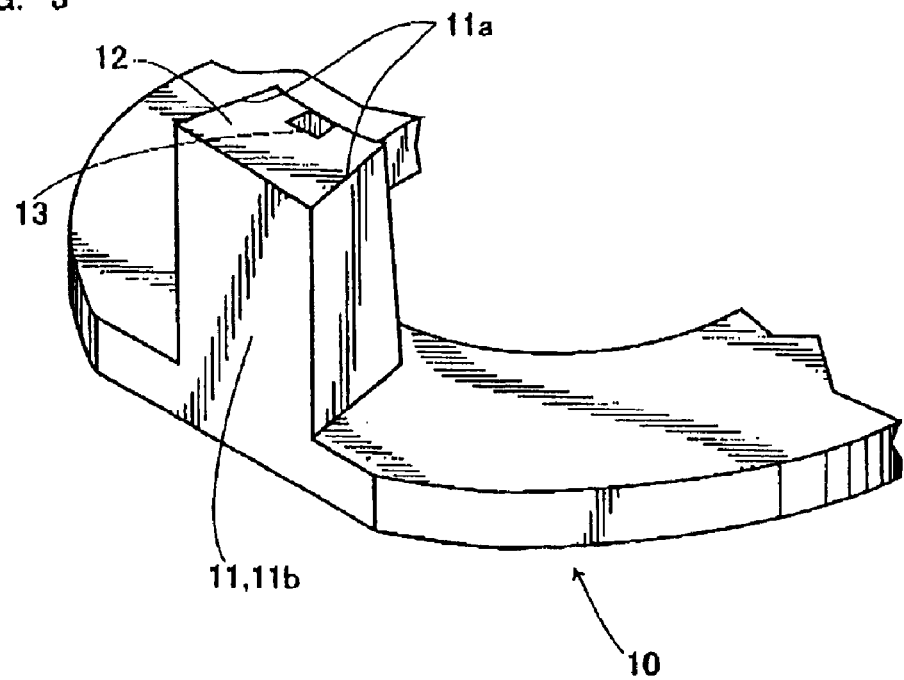
FIG. 3 is a fragmentary perspective view showing a second component of the brazed sintered compact according to the embodiment of the present invention.

As shown in FIG. 1, a brazed sintered compact of the invention is made up of a first component 1 and a second component 10. The first component 1 is provided in the form of an annular plate member as shown in FIGS. 1 and 2, while the second component 10 as another annular plate member with several legs 11 (three legs provided at equal angular intervals in the embodiment) protruded therefrom, as shown in FIG. 3. In the meantime, reference symbol H denotes a hole provided in the first component 1 for inserting a brazing material pellet thereinto. In the present embodiment, the first component 1 and the second component 10 take the shape of an annular plate member, respectively, illustrating an example of a planetary carrier composed of a pair of side plates which oppose to each other with a planetary pinion (not shown) therebetween.

These first component 1 and second component 10 are each formed by applying pressure to a powder material, and then they are combined with each other while a brazing material is filled in between the joining surfaces of the components. Thereafter, the first component 1 and the second component 10 with the brazing material being filled therebetween are brought into a sintering furnace, so that both components are sintered at a predetermined temperature, at the same time that the brazing material is fused so as to braze one of the joining surfaces of the components to the other thereof.

In the present embodiment, a joining surface 2 of the first component 1 is formed with a protrusion 3 which protrudes toward the second component 10 in order to position the first component 1 relative to the second component 10, as illustrated in FIG. 2 The protrusion 3 is provided adjacent to an inner edge of the joining surface of the first component 1, said protrusion 3 being tapered from a proximal portion toward a distal end thereof.

A joining surface 12 of the leg 11 of the second component 10 is formed with a recess 15 for fitting the protrusion 3 thereinto, said recess 13 being opposed to said protrusion 3.

Figure 4:
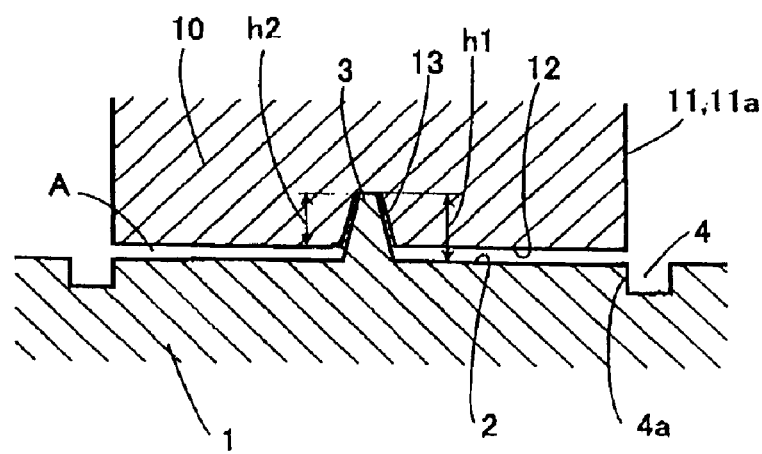
FIG. 4 is an explanatory diagram showing a joining clearance in the event that the first and the second components are combined with each other.

Specifically, a depth h2 of the recess 13 is set at a slightly smaller dimension than a protruding length h1 of the protrusion 3, as shown in FIG. 4. In other words, when the protrusion 3 is fitted into the recess 13, not only can the first component 1 be positioned relative to the second component 10, but also there can be provided a joining clearance A of which the dimension is given by (h1−h2) between the first component 1 and the second component 10.

It should be noted that the joining clearance A should have a dimension for allowing the brazing material to permeate the joining surfaces between the first component 1 and the second component 10. Accordingly, the difference between the protruding length h1 of the protrusion 3 and the depth h2 of the recess 13 is set at a value needed for a sufficient amount of the brazing material to permeate.

Further, the joining surface 2 of the first component 1 is formed with storage grooves 4, 4' for storing a surplus amount of the brazing material, as shown in FIGS. 2 and 4. These storage grooves 4,4' are provided in certain positions on the joining surface 2 of the first component 1, each having a suitable depth and width, corresponding to the peripheral edges of right and left ends 11a of the leg 11 of the second component 10 or the peripheral edge of the outer peripheral surface 11b of the leg 11, whereby the surplus brazing material is allowed to be collated therein when the brazing material is finished in the joining clearance A between the first component 1 and the second component 10.

Furthermore, an inner side surface 4a of the storage groove 4, i.e., one of the side surfaces of the storage groove 4 which is on the leg 11 side, is aligned with the left or right edge 11a of the leg 11, disposed opposite to the groove 4. Such arrangement is effected by fitting the protrusion 3 into the recess 13. Likewise, an inner side surface 4'a of the storage groove 4', i.e., one of the side surfaces of the storage groove 4' which is on the leg 11 side, is aligned with the peripheral edge of the outer peripheral surface 11b of the leg 11, disposed opposite to the groove 4'. Between the paired right and left grooves 4 is formed the aforesaid hole H for inserting a brazing material pellet.

As is apparent from the foregoing, the protrusion 3 is formed on the joining surface 2 of the first component 1, while the recess 13 of which the dimension is smaller than the height of the protrusion 3 is formed on the joining surface 12 of the leg 11 of the second component 10, so that if only the protrusion 3 of the first component 1 is fitted into the recess 13 of the second component 10, not only can both components 1 and 10 be properly positioned relative to each other, but also can the joining clearance A be easily obtained between the joining surface 2 of the first component 1 and the joining surface 12 of the second component, corresponding to the dimensional difference therebetween.

Accordingly, if both components are sintered with the clearance A being filled with the brazing material after the joining clearance A is set at a predetermined dimension for permeation of the brazing material, it is possible to allow as much brazing material as properly needed to permeate between the joining surfaces 2 and 12 of the first and second components 1 and 10, thus enabling a desirable brazing strength to be obtained reliably, thereby enhancing the reliability of the brazing strength. It is to be noted that finish machining is performed after being joined thus way.

Also, whilst the surplus amount of the fused brazing material is likely to jut out to the external, the storage grooves 4,4' are provided on the joining surface 2 of the first component 1 so that the surplus amount of the brazing material may be stored therein, whereby not only can the surplus brazing material be prevented from coming out of the components, which eliminates the risk of impairing the appearance, but also can the trouble of removing the surplus brazing material ho saved. Still also, as the storage grooves 4,4' are provided in the positions corresponding to the peripheral edge of the right and left ends 11a of the leg 11 of the second component, and the peripheral edge of the peripheral outer surface 11b of the leg 11, respectively, a relatively large amount of the surplus brazing material can be accommodated therein.

Furthermore, the inside surfaces 4a, 4'a of the storage grooves 4, 4' are each aligned with the side surface of the loft or right edge 11a of the leg 11 and the peripheral edge of the peripheral outer surface 11b of the leg 11, disposed opposite to the groove 4,4', while these storage grooves 4,4' are fully opened upward, whereby the length of the clearance A overhanging the storage grooves 4, 4' is reduced to minimum, thus facilitating the prompt discharge of the surplus brazing material to the outside.

Still further, even if the brazing material stored in the storage grooves 4, 4' is urged to flow back, yet the surface tension of the surplus brazing material becomes unlikely to be developed in the storage grooves 4,4', since the inside surfaces 4a, 4'a of the storage grooves 4, 4' are each aligned with the side surface of the left or right edge 11a of the leg 11 and the peripheral edge of the peripheral outer surface 11b of the leg 11, disposed opposite to the groove 4,4', with those storage grooves 4, 4' being fully opened upward, thereby preventing the backflow of the surplus brazing material.

Figure 5:
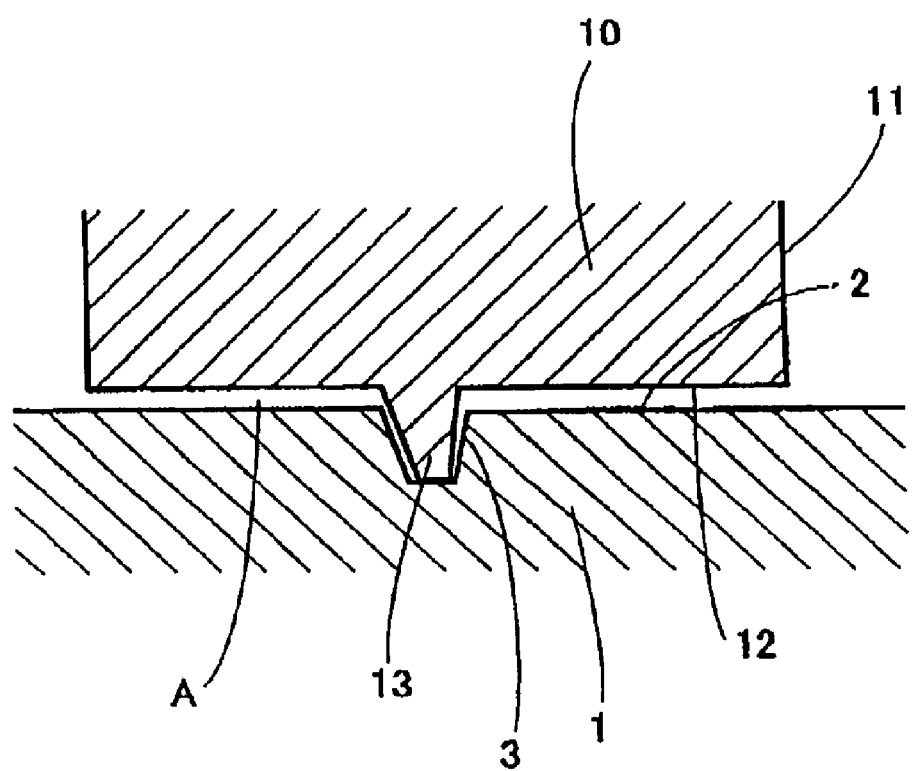
FIG. 5 is another explanatory diagram showing another embodiment of the invention, illustrating other examples of the protrusion, recess and storing groove of the invention.

Incidentally, the present invention should not be limited to the above-mentioned embodiment but various modifications are possible within the scope of the invention. For example, although the protrusion 3 is provided on the first component 1 and the recess 13 on the leg 11 of the second component 10 in the foregoing embodiment, the arrangement thereof is not limited thereto. For example, the protrusion 3 may be provided on the latter while the recess 13 on the former, as shown in FIG. 5, and any other arrangement may be employed as long as the same action and effect of the invention is attained. Although the first component 1 and the second component 10 are subjected to sintering and brazing at the same time in the foregoing embodiment, they may be separately sintered and then subjected to brazing process.

What is claimed is:

1. A brazed sintered compact composed of at least a first component and a second component, each component having a joining surface and joined to each other by brazing, comprising:

a protrusion formed on the joining surface of one of the first and second components;

a recess formed on the joining surface of the other of the first and second components, said recess being fitted to said protrusion, having such a depth as allows for a desirable joining clearance between the first and the second components when the former is fitted to the latter, and at least one storage groove formed on the joining surface of one of the first and second components, said storage groove being provided for storing a surplus amount of a brazing material, and disposed opposite to a side portion of the other of the first and second components.

2. A brazed sintered compact composed of at least a first component and a second component, each component having a joining surface and joined to each other by brazing, comprising:

a protrusion formed on the joining surface of one of the first and second components;

a recess formed on the joining surface of the other of the first and second components, said recess being fitted to said protrusion, having such a depth as allows for a desirable joining clearance between the first and the second components when the former is fitted to the latter, and at least one storage groove formed on a peripheral edge of the joining surface of one of the first and second components, said storage groove being provided for storing a surplus amount of a brazing material, arranged such that an inside surface of the storage groove is aligned with an opposite portion of the other of the first and second components.

3. A brazed sintered compact according to claim 2, wherein said clearance has such a dimension as properly needed to allow the brazing material to permeate between the joining surfaces of said first and second components.

4. A brazed sintered compact according to claim 3, wherein said first component and second component are annular plate materials each of which is formed from metal powder individually, and then they are combined with each other while a brazing material is filled in between the joining surfaces of the components, so that both components are sintered at a predetermined temperature in a furnace, at the same time that the brazing material is fused so as to braze one of the joining surfaces of the components to the other thereof.

5. A brazed sintered compact according to claim 4, wherein said storage groove is fully opened upward.

6. A brazed sintered compact according to claim 5, wherein one of said first and second components is formed with a protrusion or a recess, while the other thereof is formed with a leg opposite thereto, said leg including a recess or a protrusion on a distal joining surface thereof, and wherein the inner side surface of said storage groove is aligned with a right or a left end of said leg.

7. A brazed sintered compact according to claim 6, wherein a hole for inserting a brazing material pellet is formed between the right and the left storage grooves.

8. A brazed sintered compact according to claim 5, wherein one of said first and second components is formed with a protrusion or a recess, while the other thereof is formed with a leg opposite thereto, said leg including a recess or a protrusion on a distal joining surface thereof, and wherein the inner side surface of said storage groove is aligned with a peripheral edge of the peripheral outer surface of said leg.

9. A brazed sintered compact according to claim 5, wherein said first component and second component in the form of said annular plate member is a planetary carrier composed of a pair of side plates which oppose to each other with a planetary pinion therebetween.

* * * * *